(12) United States Patent
Treier

(10) Patent No.: US 11,478,965 B2
(45) Date of Patent: Oct. 25, 2022

(54) MOULD AND METHOD FOR FLEXIBLE HOLDING INSERTS IN THE MOLD DURING MOLDING

(71) Applicant: General Electric Technology GmbH, Baden (CH)

(72) Inventor: Lukas Treier, Holziken (CH)

(73) Assignee: General Electric Technology Gmbh, Baden (CH)

( * ) Notice: Subject to any disclaimer, the term of this patent is extended or adjusted under 35 U.S.C. 154(b) by 376 days.

(21) Appl. No.: 16/077,938

(22) PCT Filed: Feb. 14, 2017

(86) PCT No.: PCT/EP2017/053323
§ 371 (c)(1),
(2) Date: Aug. 14, 2018

(87) PCT Pub. No.: WO2017/140692
PCT Pub. Date: Aug. 24, 2017

(65) Prior Publication Data
US 2020/0061888 A1 Feb. 27, 2020

(30) Foreign Application Priority Data
Feb. 19, 2016 (EP) .................................. 16156586

(51) Int. Cl.
*B29C 45/14* (2006.01)
*H01B 13/06* (2006.01)
(Continued)

(52) U.S. Cl.
CPC ....... *B29C 45/14065* (2013.01); *H01B 13/06* (2013.01); *H02G 5/066* (2013.01);
(Continued)

(58) Field of Classification Search
CPC .... B29C 45/14065; B29C 2045/14098; B29C 2045/14163
See application file for complete search history.

(56) References Cited

U.S. PATENT DOCUMENTS 3,109,201 A * 11/1963 Dulmage .......... B29C 45/14065
249/105
2004/0251687 A1* 12/2004 Chelchowski ...... F16L 19/0231
285/354
2015/0380865 A1* 12/2015 Gerber ................... H02G 5/068
439/271

FOREIGN PATENT DOCUMENTS

DE 19816634 A1 4/1998
EP 2412504 A2 * 2/2012 ......... B29C 45/2725
(Continued)

OTHER PUBLICATIONS

Notice of Reasons for Refusal (Translated), dated Dec. 25, 2020, in application JP 2018-543333 (Year: 2020).*
(Continued)

*Primary Examiner* — Timothy Kennedy
(74) *Attorney, Agent, or Firm* — Eversheds Sutherland (US) LLP

(57) ABSTRACT

The invention relates to a mould for moulding a component with one or more inserts, the mould comprising a mould body for defining in part the shape of the component, and at least one insert holder for holding an insert within the mould body. Each insert holder is movably supported such it can move relative to the mould body in a direction of shrinkage of the component, and wherein the mould further comprises a biasing means to bias each insert holder to a first position relative to the mould body. The invention also relates to a method of moulding.

11 Claims, 2 Drawing Sheets

(51) Int. Cl.
*H02G 5/06* (2006.01)
*B29K 63/00* (2006.01)
*B29K 705/02* (2006.01)
*B29L 31/34* (2006.01)

(52) U.S. Cl.
CPC .................. *B29C 2045/14893* (2013.01);
*B29K 2063/00* (2013.01); *B29K 2705/02*
(2013.01); *B29L 2031/3412* (2013.01)

(56) References Cited

FOREIGN PATENT DOCUMENTS

| EP | 2960032 A1 | | 12/2015 |
|---|---|---|---|
| JP | H03084114 U | * | 8/1991 |
| JP | 2008182833 A | * | 8/2008 |
| JP | 2012030535 A | * | 2/2012 |

OTHER PUBLICATIONS

Office Action issued in Japanese Patent Application No. 2018-543333, dated Dec. 23, 2020, 5 pages.
European Search Report and Written Opinion dated Aug. 26, 2016 which was issued in connection with EP 16156586.6 which was filed on Feb. 19, 2016.
International Search Report and Written Opinion dated Feb. 14, 2017 which was issued in connection with PCT/EP2017/053323 which was filed on Feb. 14, 2017.

* cited by examiner

MOULD AND METHOD FOR FLEXIBLE HOLDING INSERTS IN THE MOLD DURING MOLDING

FIELD OF INVENTION

The invention relates to a mould and a method of moulding. In particular, the invention relates to a mould for casting a component with an insert, wherein the mould allows relative movement of the insert during the moulding process. The invention also relates to the field of insulators suitable for gas-insulated switchgears (GIS).

BACKGROUND OF THE INVENTION

Switchgears are provided in high voltage electrical power systems to enable downstream equipment to be de-energised and isolated so as to permit, for example, repair, maintenance, or installation of a new component. Gas insulated switchgears (GIS) are generally preferred to other types of switchgears as they are capable of safely handling large currents and power levels while occupying a substantially smaller volume.

Electrical conductors in the GIS travel through tubular compartments filled with gas, typically $SF_6$ gas. Individual sections of the electrical conductors are supported by insulators at various intervals within the tubular compartments. Insulators for GIS frequently take the form of an epoxy resin disc corresponding to the tubular compartment, with one or three metallic inserts (corresponding to single or three-phase electricity as appropriate), protruding axially from both sides of the disc to which the conductors are connected. The insulators serve to insulate the conductors from the surrounding wall of the tubular compartment, and also from each other. Occasionally, these insulators are concurrently used to seal the barrier between adjacent gas-filled compartments of the GIS. Where they are used as sealed barrier insulators, they need to meet stringent requirements, such as being able to withstand routine pressure tests, bursting tests, and being able to last the lifetime of the GIS.

Such GIS insulators are commonly manufactured by injection moulding with the conducting inserts prepositioned in the mould prior to casting. So as to ensure that the inserts maintain their position, they are held fixed relative to the mould throughout the moulding process.

However, during the cooling phase of the moulding process, the differences in thermal expansion coefficients causes the epoxy resin to shrink more than the metallic inserts and the mould. The metallic inserts, which are fixed with respect to the mould, are unable to yield to the pulling forces brought about by the epoxy shrinking radially towards the centre of the mould. This gives rise to stresses at the interface of the metallic inserts and the epoxy resin, which in turn results in poor adhesion and imperfections, such as micro-voids, being present at this interface. The poor adhesion brought about by the shrinkage differential between the two can give rise to failure.

So as to overcome this problem, attempts have been made to heat the inserts and the mould during the moulding process so as to control their shrinking during the cooling phase, to thereby achieve better adhesion between the epoxy resin and the metallic inserts. This approach, although experiencing some success, has proven insufficient to reliably address the problem.

As such, there is clearly a need for a GIS insulator that does not possess the defects of the prior art and is of superior mechanical integrity. There is equally a need for a better means of producing such an insulator which can accommodate or overcome the effects of shrinkage during the manufacturing process.

SUMMARY

The present invention provides a mould for moulding a component with one or more inserts, the mould including a mould body for defining in part the shape of the component, and at least one insert holder for holding an insert within the mould body. Each insert holder is movably supported such it can move relative to the mould body in a direction of shrinkage of the component, and in that the mould further comprises a biasing means to bias each insert holder to a first position relative to the mould body.

The present invention also provides a method of moulding a component with one or more inserts while accommodating for shrinkage of the component during the moulding process, the method including:
 providing a mould with a mould body and at least one insert holder,
 providing an insert to each insert holder and holding it using its respective insert holder,
 providing the moulding material into the mould body,
 supporting each insert holder movably relative to the mould body biasing each insert holder to a first position relative to the mould body, and
 allowing each insert holder to be drawn by the inserts to a second position in a direction of shrinkage during the cooling phase.

BRIEF DESCRIPTION OF THE DRAWINGS

The invention will be better understood when reading the following detailed description and non-limiting examples, as well as studying the figures, wherein.

In all of these figures, identical references can designate identical or similar elements. In addition, the various portions shown in the figures are not necessarily shown according to a uniform scale, in order to make the figures more legible.

DETAILED DESCRIPTION

Figure 1:
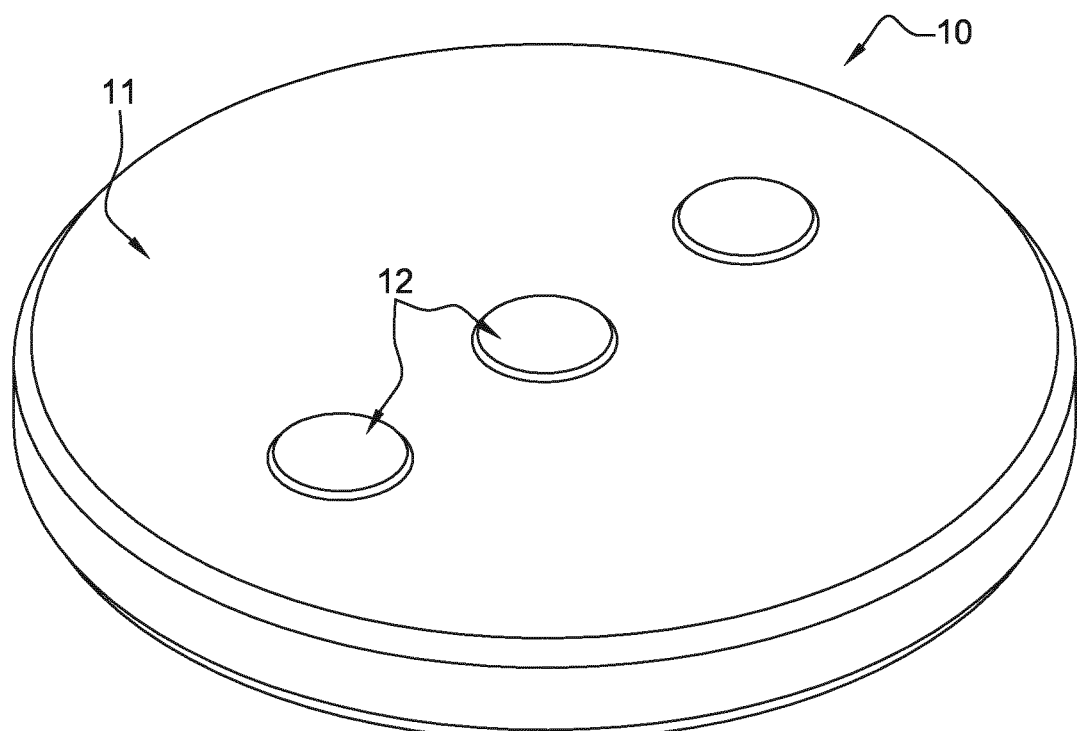
FIG. 1 illustrates an insulator with three metallic inserts for a three-phase gas-insulated switchgear

FIG. 1 shows an insulator 10 of a standard shape and form for a three-phase gas-insulated switchgear (GIS), comprising an epoxy resin disc 11 with three metallic inserts 12, made using the mould and method of the invention. The three inserts 12 are distributed in a straight line extending along the diameter of the insulator 10, and correspond to the three-phase GIS they are adapted for.

Figure 2:
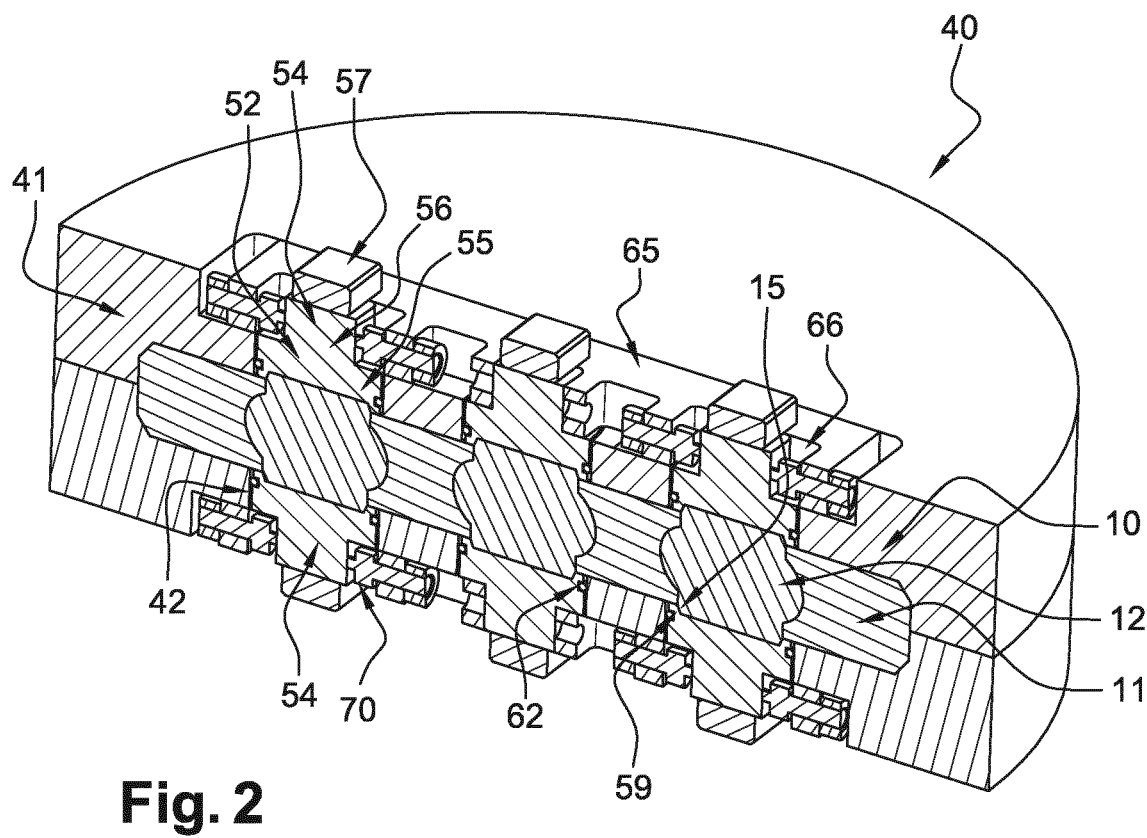
FIG. 2 shows a cut-away view of the mould for moulding an insulator as shown in FIG. 1

FIG. 2 shows a cut-away view along the principal diameter of a two-part steel mould 40 according to an embodiment of the invention, suitable for casting epoxy resin insulators 10 for a GIS, in particular an insulator 10 of the type generally depicted in FIG. 1 (also shown within the mould for reasons of clarity). The mould 40 is configured to allow the metallic inserts 12, the two outer (left and right) ones in this case, to move relative to the mould so as to accommodate for shrinkage during the moulding process.

Figure 3:
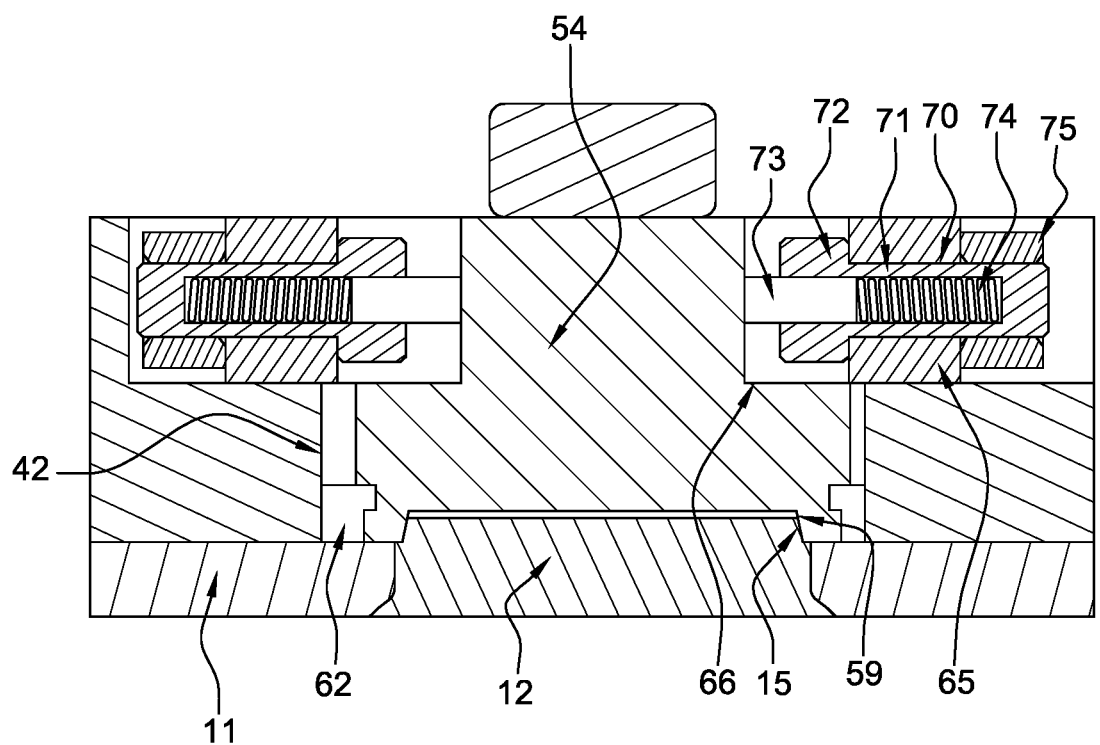
FIG. 3 shows a close up cross-section view of the upper left section of the mould shown in FIG. 2, indicating position of the insert holder after the cooling phase.

FIG. 3 shows a close up cross-section view of the upper left section of the mould 40, after the cooling phase.

The mould 40 comprises a top mould having a top mould body and a bottom mould having a bottom mould body. The top and bottom mould bodies together form a mould body 41, which makes up the primary part of the mould 40 defining the disc-shaped cavity corresponding to the overall form of the intended insulator 10.

In addition, the mould 40 also comprises three insert holders 52 for holding a respective insert 12 within the cavity of the mould 40. Each insert holder 52 comprises a pair of opposing receptors 54, i.e. an upper receptor and a lower receptor as shown in the figure, adapted for securely holding the inserts 12 within the mould. Each of the receptors 54 resides in a respective opening 42 provided in the body of the mould 41, with the openings 42 dimensioned to be slightly larger than the receptors 54, at least in the direction of shrinkage of the component to be moulded.

Note that while a moulded component shrinking during the cooling phase will usually shrink in all directions, there are likely to be certain principal directions in which shrinkage will be predominant. For plate-like objects, such as the GIS insulator, the primary direction of shrinkage will typically be in the radial direction towards the centre, with the radially outermost parts experiencing the largest displacement. For a long beam, it will typically be in the longitudinal direction. In an embodiment, the mould 40 is able to accommodate shrinkage in one of the principal directions of shrinkage, and ideally in the primary direction of shrinkage of the component 10 that it is designed to cast. It should also be stated here that the direction of shrinkage of the component 10 is not necessarily relevant only to the component 10, but is arguably a characteristic of the mould 40 often known even at the design phase.

The insert holders 52 are shaped so as to receive the ends of the barrel-shaped inserts 12 in a secure and sealing manner. As can be seen, the receptors 54 of the insert holders 52 are each designed with a frustum-shaped recess 59 so as to accurately match and seal against the frustum-shaped convex ends 15 of the inserts 12. Not only does this ensure that the inserts 12 are held securely, it also ensures that the epoxy resin does not flow onto the ends of the metallic inserts 12 during the moulding process.

So as to support and guide the movement of the receptors 54 in the mould body 41, two carriers 65 are provided, each fixedly located in a respective recess provided on the mould body 41. The upper carrier is arranged to support the set of three upper receptors in the upper mould body while the lower carrier supports the set of three receptors in the lower mould body. Note that these carriers 65 may equally be part of the mould body 41 as opposed to being a separate unit. Slots 66 are provided along the length of each carrier 65, with the stems 56 of the insert holders extending through the slots 66.

Each carrier 65 restricts movement of its respective set of receptors in the vertical direction. It will be noticed that the head 55 of the receptor 54 will abut the inner side of the carrier 65 if moved in the outward direction relative to the mould body 41, while the peg 57 provided at the opposite end of the receptor 54 will abut the outer side of the carrier 65 when moved in the inward direction. This not only allows the receptors 54 to be held in a fixed vertical position relative to the mould body 41, it additionally prevents the receptors 54 from falling away from or falling into the mould 40.

The slots 66 are also dimensioned to restrict movement of the receptors 54 in a direction transverse to the principal diameter. However, the carrier 65 is designed to allow movement of the receptor 54 along the principal diameter of the mould 40. In particular, the two outer slots 66 have a length which is larger than the corresponding dimension of the stems 56 of the respective receptor 54, permitting them to slide in the radial direction of the mould body 41, i.e. away from the centre of the mould body 41, and also towards the centre of the mould body 41 (which is the primary direction of shrinkage of the component 10 to be cast in the mould). The carrier 65 therefore defines, in part, the movement range of the receptors 54 relative to the mould body 41, with the openings 42 also defining this movement range in part.

As a consequence, the inserts 12 held in the two outer insert holders 52 will be able to move relative to the mould body 41, and relative to the two other inserts 12. The inserts 12 on the outside can be said to be 'floating', in the sense that they can move within the mould body 41 or relative to each other.

The middle insert holder is, in this particular case, fixed by the carriers as it holds an insert in the dead centre of the mould cavity, where traction forces arising during shrinkage will effectively cancel. However, it will be understood that even the middle insert holder can be made movable.

So as to prevent the epoxy resin 11 from leaking out of the mould 40 between the receptor 54 and the wall of the opening 42, a seal is provided around each receptor 54 to seal it against the wall of the opening 42. In an embodiment, this takes the form of a compressible sealing ring 62 provided on a groove on the circumference of the receptor 54 and which maintains a sealing contact between the receptor 54 and the wall of the opening 42 wherever it slides within the opening 42.

The mould 40 further comprises biasing means 70 to bias each of the outer (left and right) insert holders 52 to a first position within their respective openings 42. The biasing means takes the form of a spring-loaded pin 70. In an embodiment, the spring-loaded pin 70 comprises a pin 73 is slidably provided within a tubular housing 71 and under the action of the helical spring 74. The tubular housing 71 has a stopper portion 72. The one end of the tubular housing 71 is inserted in a hole in the carrier 65 until the stopper 72 abuts the carrier, and is then secured at the opposite end by a screw 75. The stopper 72 may also serve as an abutment for the stem of the receptor 56 when it comes to the end of its travel in the slot 66 defined on the carrier 65.

In this embodiment, two such springs-loaded pins 70 have been provided for each receptor 54 of the outer insert holders 52, located at diametrically opposed sides of the stem 56 of each receptor 54. The insert holders 52 are thus spring-biased towards a first position at the centre of the opening 42 in which they reside, held in place by the combined action of the springs-loaded pins 70. It will also be observed that movement of the insert holders 52 in the direction of shrinkage will encounter resistance from the springs-loaded pins 70. In an alternative embodiment, only one spring-loaded pin 70 may be furnished biasing the receptor 54 towards the end of its slot in the carrier opposite to the direction of shrinkage.

The biasing means 70 must be strong, stable and tight, to ensure precise positioning of the metallic inserts 12. However, it is equally important that the biasing means 70 is not so strong as to impede the movement of the inserts 12 during the cooling phase. In an embodiment, the biasing means 70 restrict free movement of the insert holders 12, but permits movement that is necessary to accommodate for shrinkage during moulding. While biasing means in the form of spring-loaded pins 70 are generally preferred, it will be understood that other forms of biasing means may also be suitable.

Furthermore, while a mould 40 for moulding an insulator 10 with three inserts 12 running along the diameter has been discussed, it will be appreciated that other arrangements may equally be possible. For example, a mould for casting an insulator with the three inserts in a triangular distribution equidistant from the centre of the insulator, or even a mould for casting an insulator with just one insert can be envisaged.

The mould 40 will now be briefly discussed in relation to method of moulding an epoxy resin insulator 10 with aluminium inserts 12 so as to improve the understanding of the invention. The mould 40 is first opened to reveal the receptors 54 of each insert holder 52 biased to their first (neutral) position. Next, an aluminium insert 12 is placed on each of the receptors 54 in the bottom mould body such that they sit neatly within the frustum-shaped recess 59 of the receptors 54 of the insert holders 52. The mould 40 is then carefully closed, ensuring that the receptors 54 in the top mould body correctly engage the top end of their respective aluminium inserts 12. Once the top and bottom mould bodies are clamped together, epoxy resin 11 is injected into the mould 40. The epoxy resin 11 flows into the mould cavity and around the aluminium inserts 12 until the mould cavity is filled. It does not seep out onto the ends of the aluminium insert 12 nor through the openings 42 of the mould body 41 because of the sealing provided.

As the epoxy resin 11 begins to cool and harden, the moulded insulator 10 will begin to shrink. Due to the different thermal expansion coefficients, the epoxy resin 11 will shrink quicker, or more, than the aluminium inserts 12 (and the steel mould 40), thereby exerting a traction force on the aluminium inserts 12 pulling them towards the centre. However, as the two insert holders 52 on the sides are configured to be able to move in the radial direction, they will be drawn against the bias of the spring-loaded pins 70, in the direction of the shrinking epoxy resin 11.

FIG. 3 depicts the position the top left receptor 54 is likely to adopt after the cooling phase of the moulding process. The receptor 54, while initially starting off at a first position at the middle of its opening 42, has assumed a second position substantially towards the right of the opening 42, after being drawn by the epoxy resin 11 pulling the aluminium insert 12 in the direction of shrinkage. By allowing movement of the receptors 54 and thus the aluminium insert 12 in this direction, the traction forces between the inserts 12 and the moulding material 11 is significantly reduced. This in turn results in an improved and uniform adhesion at the interface of each aluminium insert 12 and the surrounding epoxy resin 11, and thus in a GIS insulator 10 of superior mechanical strength free from the defects of the prior art.

While the movement of the insert holders during moulding is described as being restricted to movement in the radial direction only, this is primarily in the interest of precision. The insert holders do not necessarily need to be supported such that they can only move in or along their primary direction of shrinkage, but may be supported so as to be movable in another direction too. In fact, the insert holders may be supported so as to be able to move in any direction relative to the mould.

In a variant, the carriers themselves may be arranged to be movable relative to the mould body.

Although discussed primarily in relation to casting an insulator for a GIS, it will be appreciated that the mould and moulding method may lend themselves to casting of other types of components having inserts other than GIS insulators. Such applications will be obvious to the skilled person, and are intended to be covered by scope of the invention.

What I claim is:

1. A mould for moulding an insulator component associated with a gas-insulated switchgear with one or more inserts positioned within moulding material, the mould comprising a mould body defining a disc-shaped cavity for defining in part the shape of the insulator component, and at least one insert holder for holding an insert within the mould body, wherein the at least one insert holder is movably supported such that it can move relative to the mould body in a radial direction of the insulator component, and in that the mould further comprises a biasing means to bias the at least one insert holder to a first position relative to the mould body in the radial direction, wherein the mould when filled with an epoxy resin, and after the epoxy resin is removed from the mould, provides a moulded insulator component for a gas-insulated switchgear.

2. The mould according to claim 1, wherein the at least one insert holder comprises opposing receptors for engaging an insert.

3. The mould according to claim 2, wherein that each receptor extends through an opening in the mould body.

4. The mould according to claim 3, wherein that a compressible sealing ring is provided between each receptor and its respective opening in the mould body.

5. The mould according to claim 4, wherein that each receptor is supported and guided by a carrier which defines, in part at least, the movement range of the receptor relative to the mould body.

6. The mould according to claim 1, wherein that the biasing means is also configured to oppose movement of each insert holder towards a second position in the direction of shrinkage.

7. The mould according to claim 1, wherein that the biasing means comprises a spring-loaded pin.

8. The mould according to claim 1, wherein that the mould is for an epoxy resin insulator with aluminum inserts for a gas-insulated switchgear.

9. A method of moulding an insulator component for a gas-insulated switchgear with one or more inserts while accommodating for shrinkage of the component during the moulding process, the method comprising:
   providing a mould with a mould body defining a disc-shaped cavity for defining in part the shape of the component insulator and at least one insert holder,
   providing an insert to the at least one insert holder and holding it using its respective insert holder positioned within moulding material,
   providing the moulding material into the mould body,
   wherein that the method further comprises:
   supporting the at least one insert holder movably relative to the mould body,
   biasing the at least one insert holder to a first position relative to the mould body in a radial direction, and
   allowing the at least one insert holder to be drawn by the inserts to a second position in the radial direction during the cooling phase, wherein the mould when filled with a moulding material, and after the moulding material is removed from the mould, provides a moulded insulator component for a gas-insulated switchgear.

10. The method of moulding according to claim 9, wherein that the method further comprises:
  opposing the movement of the at least one insert holder when it moves towards a second position in the direction of shrinkage.

11. The method of moulding according to claim 9, wherein the method is for moulding an insulator for a gas-insulated switchgear.

\* \* \* \* \*